United States Patent
Takatsuka et al.

(10) Patent No.: US 10,643,272 B2
(45) Date of Patent: May 5, 2020

(54) BATTERY RESERVATION DEVICE

(71) Applicant: OMRON CORPORATION, Kyoto-shi, Kyoto (JP)

(72) Inventors: Hiromasa Takatsuka, Tokyo (JP); Junichi Wada, Tokyo (JP); Kazuki Kasai, Tokyo (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/759,226

(22) PCT Filed: Nov. 2, 2016

(86) PCT No.: PCT/JP2016/082565
§ 371 (c)(1),
(2) Date: Mar. 12, 2018

(87) PCT Pub. No.: WO2017/086161
PCT Pub. Date: May 26, 2017

(65) Prior Publication Data
US 2018/0260887 A1    Sep. 13, 2018

(30) Foreign Application Priority Data

Nov. 17, 2015   (JP) .................................. 2015-224388

(51) Int. Cl.
*G05B 19/418*    (2006.01)
*G06Q 30/06*    (2012.01)
(Continued)

(52) U.S. Cl.
CPC .......... *G06Q 30/0645* (2013.01); *B60L 50/50* (2019.02); *B60L 53/31* (2019.02);
(Continued)

(58) Field of Classification Search
CPC . Y02T 90/128; Y02T 90/163; Y02T 10/7291; Y02T 90/16; Y02T 10/7088;
(Continued)

(56) References Cited

U.S. PATENT DOCUMENTS

| | | |
|---|---|---|
| RE30,939 E | 5/1982 | dAlayer de Costemore dArc et al. |
| 4,411,008 A | 10/1983 | dAlayer de Costemore dArc et al. |

(Continued)

FOREIGN PATENT DOCUMENTS

| | | |
|---|---|---|
| CN | 1293149 A | 5/2001 |
| CN | 103522994 A | 1/2014 |

(Continued)

OTHER PUBLICATIONS

The Taiwanese Office Action (TWOA) dated Feb. 21, 2018 in a counterpart Taiwanese patent application.

(Continued)

*Primary Examiner* — Darrin D Dunn
(74) *Attorney, Agent, or Firm* — Metrolex IP Law Group, PLLC

(57) ABSTRACT

A battery reservation device (10) comprises a required charge amount acquisition component (11), a remaining battery charge acquisition component (12), a charging speed acquisition component (14), and an exchange completion time calculator (16). The required charge amount acquisition component (11) inputs the amount of battery charging needed by the user. The remaining battery charge acquisition component (12) acquires the remaining battery charge at the present time for each of the battery packs (1) at a plurality of battery stations (30). The charging speed acquisition component (14) acquires the charging speeds at the plurality of battery stations (30). The exchange completion time calculator (16) calculates the exchange completion time for (Continued)

the battery packs (1) at the plurality of battery stations (30) on the basis of the acquired required charge amount, the remaining battery charge at the present time, and the battery charging speed.

7 Claims, 8 Drawing Sheets

(51) Int. Cl.
| | |
|---|---|
| G01C 21/26 | (2006.01) |
| H01M 10/42 | (2006.01) |
| H02J 7/04 | (2006.01) |
| G06Q 10/02 | (2012.01) |
| G06Q 50/10 | (2012.01) |
| H02J 7/00 | (2006.01) |
| B60L 50/50 | (2019.01) |
| B60L 53/31 | (2019.01) |
| B60L 53/66 | (2019.01) |
| B60L 58/13 | (2019.01) |
| B60L 53/65 | (2019.01) |
| G06Q 50/06 | (2012.01) |
| H01M 10/44 | (2006.01) |

(52) U.S. Cl.
CPC ............. *B60L 53/65* (2019.02); *B60L 53/665* (2019.02); *B60L 58/13* (2019.02); *G01C 21/26* (2013.01); *G06Q 10/02* (2013.01); *G06Q 50/06* (2013.01); *G06Q 50/10* (2013.01); *H01M 10/42* (2013.01); *H01M 10/425* (2013.01); *H01M 10/441* (2013.01); *H02J 7/00* (2013.01); *H02J 7/04* (2013.01); *B60L 2200/12* (2013.01); *H01M 2010/4271* (2013.01); *H01M 2220/20* (2013.01); *Y02T 90/124* (2013.01)

(58) Field of Classification Search
CPC . Y02T 90/162; Y02T 90/124; Y02T 10/7283; G01C 21/3415; G01C 21/3476; G01C 21/343; G01C 21/34; G01C 21/3438; G01C 21/3679; G01C 21/3682; B60L 2240/80; B60L 53/65; B60L 2240/72; B60L 53/60; B60L 2260/52
See application file for complete search history.

(56) References Cited

U.S. PATENT DOCUMENTS

| | | | |
|---|---|---|---|
| 4,983,903 A | 1/1991 | Bae et al. | |
| 5,048,353 A | 9/1991 | Justus et al. | |
| 5,545,967 A | 8/1996 | Osborne et al. | |
| 5,563,809 A | 10/1996 | Williams et al. | |
| 5,612,606 A | 3/1997 | Guimarin et al. | |
| 5,623,194 A * | 4/1997 | Boll | B60L 53/305 320/137 |
| 5,711,648 A | 1/1998 | Hammerslag | |
| 6,036,137 A | 3/2000 | Myren | |
| 6,325,321 B1 | 12/2001 | Maurer et al. | |
| 6,363,434 B1 | 3/2002 | Eytchison | |
| 6,498,454 B1 | 12/2002 | Pinlam et al. | |
| 6,498,457 B1 | 12/2002 | Tsuboi | |
| 7,002,265 B2 | 2/2006 | Potega | |
| 7,412,538 B1 | 8/2008 | Eytchison et al. | |
| 8,484,060 B2 * | 7/2013 | D'Andrea | G06Q 10/06 705/7.13 |
| 8,634,879 B2 | 1/2014 | Shi et al. | |
| 8,698,642 B2 * | 4/2014 | Taguchi | B60L 3/12 340/636.1 |
| 8,751,077 B2 * | 6/2014 | Hiruta | G01C 21/3469 701/22 |
| 8,825,248 B2 * | 9/2014 | Maki | G01C 21/3697 701/22 |
| 8,838,318 B2 | 9/2014 | Segawa et al. | |
| 8,862,391 B2 | 10/2014 | Park et al. | |
| 8,941,463 B2 | 1/2015 | Rovik et al. | |
| 8,952,656 B2 | 2/2015 | Tse | |
| 8,963,495 B2 | 2/2015 | Park et al. | |
| 8,970,341 B2 | 3/2015 | Park et al. | |
| 9,123,035 B2 | 9/2015 | Penilla et al. | |
| 9,129,272 B2 | 9/2015 | Penilla et al. | |
| 9,156,360 B2 | 10/2015 | Park et al. | |
| 9,170,118 B2 * | 10/2015 | Kiyama | G01C 21/3469 |
| 9,172,254 B2 | 10/2015 | Ganor | |
| 9,177,305 B2 | 11/2015 | Penilla et al. | |
| 9,177,306 B2 | 11/2015 | Penilla et al. | |
| 9,193,277 B1 | 11/2015 | Penilla et al. | |
| 9,248,752 B2 * | 2/2016 | Kuribayashi | B60L 53/11 |
| 9,302,592 B2 | 4/2016 | Lin et al. | |
| 9,321,357 B2 | 4/2016 | Caldeira et al. | |
| 9,371,007 B1 * | 6/2016 | Penilla | B60L 11/1848 |
| 9,440,544 B2 | 9/2016 | Lewis et al. | |
| 9,442,548 B1 | 9/2016 | Johansson et al. | |
| 9,488,493 B2 * | 11/2016 | MacNeille | G01C 21/3697 |
| 9,496,736 B1 | 11/2016 | Johansson et al. | |
| 9,597,973 B2 | 3/2017 | Penilla et al. | |
| 9,623,762 B2 * | 4/2017 | Park | B60L 11/185 |
| 9,738,168 B2 | 8/2017 | Penilla et al. | |
| 9,925,882 B2 | 3/2018 | Penilla et al. | |
| 9,987,938 B2 | 6/2018 | Salasoo | |
| 10,084,329 B2 | 9/2018 | Hamilton et al. | |
| 10,086,714 B2 | 10/2018 | Penilla et al. | |
| 10,116,151 B2 | 10/2018 | Seng | |
| 10,209,090 B2 | 2/2019 | Luke et al. | |
| 10,245,964 B2 | 4/2019 | Penilla et al. | |
| 10,286,801 B2 | 5/2019 | Shimizu et al. | |
| 2003/0069868 A1 | 4/2003 | Vos | |
| 2003/0074134 A1 | 4/2003 | Shike et al. | |
| 2003/0085621 A1 | 5/2003 | Potega | |
| 2004/0113591 A1 * | 6/2004 | Bradley | H02J 7/0086 320/133 |
| 2004/0158544 A1 | 8/2004 | Taekman et al. | |
| 2005/0035740 A1 | 2/2005 | Elder et al. | |
| 2005/0035741 A1 | 2/2005 | Elder et al. | |
| 2006/0181427 A1 | 8/2006 | Bouse et al. | |
| 2007/0043665 A1 | 2/2007 | Jemella et al. | |
| 2007/0176040 A1 | 8/2007 | Asikainen et al. | |
| 2008/0157722 A1 | 7/2008 | Nobutaka et al. | |
| 2008/0215180 A1 | 9/2008 | Kota | |
| 2009/0082957 A1 | 3/2009 | Agassi et al. | |
| 2009/0088889 A1 | 4/2009 | Hellstrom et al. | |
| 2009/0243549 A1 * | 10/2009 | Matsumura | H01M 10/44 320/155 |
| 2009/0315359 A1 | 12/2009 | Suzuki et al. | |
| 2010/0071979 A1 | 3/2010 | Heichal et al. | |
| 2010/0100573 A1 | 4/2010 | Harel et al. | |
| 2010/0105449 A1 | 4/2010 | Shi et al. | |
| 2010/0106401 A1 | 4/2010 | Naito et al. | |
| 2010/0164439 A1 * | 7/2010 | Ido | B60W 10/26 320/155 |
| 2010/0230188 A1 | 9/2010 | Nguyen | |
| 2010/0289451 A1 | 11/2010 | Tuffner et al. | |
| 2011/0032110 A1 * | 2/2011 | Taguchi | B60L 3/12 340/636.1 |
| 2011/0128007 A1 * | 6/2011 | Nishidai | B60L 53/68 324/427 |
| 2011/0156662 A1 | 6/2011 | Nakamura et al. | |
| 2011/0225105 A1 | 9/2011 | Scholer et al. | |
| 2011/0257901 A1 | 10/2011 | Bechhoefer | |
| 2011/0303509 A1 | 12/2011 | Agassi et al. | |
| 2012/0054076 A1 | 3/2012 | Wu et al. | |
| 2012/0098676 A1 * | 4/2012 | Oizumi | G01C 21/3697 340/901 |
| 2012/0109519 A1 * | 5/2012 | Uyeki | B60L 7/14 701/439 |
| 2012/0112696 A1 * | 5/2012 | Ikeda | H02J 3/14 320/109 |
| 2012/0136594 A1 | 5/2012 | Tang et al. | |
| 2012/0229089 A1 | 9/2012 | Bemmel et al. | |

(56) References Cited

U.S. PATENT DOCUMENTS

| | | |
|---|---|---|
| 2012/0242148 A1 | 9/2012 | Galati |
| 2012/0271723 A1 | 10/2012 | Penilla et al. |
| 2012/0306445 A1 | 12/2012 | Park et al. |
| 2012/0326655 A1* | 12/2012 | Nomura ................. H02J 7/044 320/107 |
| 2013/0013139 A1* | 1/2013 | Maki .................. G01C 21/3469 701/22 |
| 2013/0030581 A1 | 1/2013 | Luke et al. |
| 2013/0030608 A1 | 1/2013 | Taylor et al. |
| 2013/0046457 A1* | 2/2013 | Pettersson .............. B60L 58/16 701/117 |
| 2013/0049677 A1 | 2/2013 | Bouman |
| 2013/0119920 A1 | 5/2013 | Hsu et al. |
| 2013/0151293 A1 | 6/2013 | Kamer et al. |
| 2013/0192060 A1 | 8/2013 | Park et al. |
| 2013/0197803 A1 | 8/2013 | Park et al. |
| 2013/0226441 A1 | 8/2013 | Horita |
| 2013/0261953 A1* | 10/2013 | Kiyama ............. G01C 21/3469 701/400 |
| 2013/0282472 A1* | 10/2013 | Penilla .................. B60L 53/305 705/14.35 |
| 2013/0317790 A1* | 11/2013 | Fukubayashi .............. B60L 3/12 703/1 |
| 2013/0335025 A1* | 12/2013 | Kuribayashi ........... B60L 53/52 320/109 |
| 2013/0342310 A1 | 12/2013 | Park et al. |
| 2013/0343842 A1 | 12/2013 | Yu |
| 2013/0345976 A1* | 12/2013 | Li ...................... G01C 21/3476 701/533 |
| 2014/0002019 A1 | 1/2014 | Park et al. |
| 2014/0046595 A1 | 2/2014 | Segawa et al. |
| 2014/0100689 A1 | 4/2014 | Yu |
| 2014/0116124 A1 | 5/2014 | Ma et al. |
| 2014/0125281 A1* | 5/2014 | Mitsutani .............. H01M 10/48 320/109 |
| 2014/0148965 A1 | 5/2014 | Epstein et al. |
| 2014/0163877 A1 | 6/2014 | Kiyama et al. |
| 2014/0172282 A1* | 6/2014 | Feng ...................... B60L 58/12 701/117 |
| 2014/0232340 A1 | 8/2014 | Jones |
| 2014/0257884 A1 | 9/2014 | Kyoung |
| 2014/0266004 A1* | 9/2014 | Andrews, Jr. ........... B60L 53/55 320/104 |
| 2014/0371969 A1* | 12/2014 | Asai ........................ B60L 58/40 701/22 |
| 2015/0012212 A1 | 1/2015 | Park et al. |
| 2015/0024240 A1 | 1/2015 | Seubert et al. |
| 2015/0039391 A1* | 2/2015 | Hershkovitz .......... G06Q 10/04 705/7.31 |
| 2015/0123611 A1 | 5/2015 | Huang |
| 2015/0127479 A1 | 5/2015 | Penilla et al. |
| 2015/0134142 A1 | 5/2015 | Taylor et al. |
| 2015/0134467 A1 | 5/2015 | Penilla et al. |
| 2015/0134546 A1 | 5/2015 | Penilla et al. |
| 2015/0149015 A1 | 5/2015 | Nakano et al. |
| 2015/0158393 A1* | 6/2015 | Kawano .................. B60L 53/65 320/109 |
| 2015/0185721 A1* | 7/2015 | Deilmann .............. H04W 4/029 700/66 |
| 2015/0202975 A1 | 7/2015 | Solomon et al. |
| 2015/0241233 A1* | 8/2015 | Loftus ................ G01C 21/3469 701/410 |
| 2015/0256003 A1 | 9/2015 | Yonetani |
| 2015/0280465 A1 | 10/2015 | Lin et al. |
| 2015/0283912 A1* | 10/2015 | Shimizu .............. B60L 11/1862 320/157 |
| 2015/0286965 A1* | 10/2015 | Amano ............. G01C 21/3469 705/5 |
| 2015/0298565 A1* | 10/2015 | Iwamura ............ G01C 21/3476 701/22 |
| 2015/0298567 A1 | 10/2015 | Uyeki |
| 2015/0321570 A1* | 11/2015 | Cun ....................... G06Q 50/06 705/34 |
| 2015/0321571 A1 | 11/2015 | Penilla et al. |
| 2015/0357837 A1* | 12/2015 | Takai .................... H01M 10/44 320/107 |
| 2015/0363749 A1 | 12/2015 | Buscher et al. |
| 2015/0367743 A1 | 12/2015 | Lin et al. |
| 2015/0380936 A1 | 12/2015 | Frolik et al. |
| 2016/0009192 A1* | 1/2016 | Zhang ................ B60L 11/1848 320/109 |
| 2016/0016481 A1* | 1/2016 | Maya .................. B60L 11/1861 340/455 |
| 2016/0025506 A1* | 1/2016 | Penilla .................. G06Q 20/18 701/430 |
| 2016/0039296 A1* | 2/2016 | Nakamura .......... B60L 11/1809 701/22 |
| 2016/0039299 A1 | 2/2016 | Nguyen |
| 2016/0071079 A1 | 3/2016 | Aloe |
| 2016/0071138 A1 | 3/2016 | Hill |
| 2016/0099590 A1 | 4/2016 | Velderman et al. |
| 2016/0117759 A1 | 4/2016 | Penilla et al. |
| 2016/0159240 A1* | 6/2016 | Tseng .................. B60L 11/1851 320/109 |
| 2016/0176307 A1* | 6/2016 | Becker ................ B60L 11/1846 320/109 |
| 2016/0185246 A1* | 6/2016 | Paul ................... B60L 11/1844 320/106 |
| 2016/0272078 A1 | 9/2016 | Kalyanaraman et al. |
| 2016/0273927 A1* | 9/2016 | Kitajima ............ G01C 21/3415 |
| 2016/0303990 A1 | 10/2016 | Penilla et al. |
| 2016/0343068 A1* | 11/2016 | Barrois ............ G06Q 10/06315 |
| 2016/0364776 A1 | 12/2016 | Khoo et al. |
| 2016/0368464 A1 | 12/2016 | Hassounah |
| 2016/0380440 A1 | 12/2016 | Coleman, Jr. et al. |
| 2017/0036560 A1* | 2/2017 | Schuelke ............ B60L 11/1844 |
| 2017/0043671 A1* | 2/2017 | Campbell .............. G01C 21/34 |
| 2017/0074677 A1* | 3/2017 | Macneille .......... G01C 21/3697 |
| 2017/0084155 A1* | 3/2017 | Mese ................ H04M 1/72519 |
| 2017/0085103 A1 | 3/2017 | Seng |
| 2017/0091890 A1* | 3/2017 | Hirose .................. G06Q 10/02 |
| 2017/0097652 A1 | 4/2017 | Luke et al. |
| 2017/0098176 A1* | 4/2017 | Hirose .................. G06Q 10/02 |
| 2017/0102695 A1 | 4/2017 | Hilemon et al. |
| 2017/0136894 A1 | 5/2017 | Ricci |
| 2017/0176195 A1* | 6/2017 | Rajagopalan ...... G01C 21/3415 |
| 2017/0190259 A1 | 7/2017 | Penilla et al. |
| 2018/0012197 A1 | 1/2018 | Ricci et al. |
| 2018/0015835 A1 | 1/2018 | Penilla et al. |
| 2018/0032920 A1 | 2/2018 | Ito |
| 2018/0041053 A1 | 2/2018 | Capizzo |
| 2018/0143029 A1* | 5/2018 | Nikulin ............. G01C 21/3469 |
| 2018/0154789 A1 | 6/2018 | Janku |
| 2018/0202825 A1* | 7/2018 | You ........................ B60L 53/305 |
| 2018/0205257 A1* | 7/2018 | Kwon .................. H05K 7/20 |
| 2018/0208069 A1 | 7/2018 | Lin |
| 2018/0241234 A1 | 8/2018 | Liang et al. |
| 2018/0244167 A1 | 8/2018 | Penilla et al. |
| 2018/0253788 A1 | 9/2018 | Takatsuka et al. |
| 2018/0253789 A1 | 9/2018 | Takatsuka et al. |
| 2018/0253928 A1 | 9/2018 | Assadsangabi et al. |
| 2018/0272878 A1* | 9/2018 | Lee .................... B60L 11/1809 |
| 2018/0312072 A1* | 11/2018 | Yang .................... B60L 53/62 |
| 2019/0006862 A1 | 1/2019 | Hamilton et al. |
| 2019/0009683 A1* | 1/2019 | Saito .................... G06Q 50/10 |
| 2019/0011926 A1* | 1/2019 | Konishi ............. G01C 21/343 |
| 2019/0031037 A1* | 1/2019 | Fendt .................. B60L 11/1838 |
| 2019/0047434 A1* | 2/2019 | Oh ...................... B60L 11/1844 |
| 2019/0061541 A1 | 2/2019 | Penilla et al. |
| 2019/0156407 A1 | 5/2019 | Igata et al. |
| 2019/0157881 A1 | 5/2019 | Velderman et al. |
| 2019/0197608 A1 | 6/2019 | Iwai et al. |

FOREIGN PATENT DOCUMENTS

| | | |
|---|---|---|
| CN | 104583719 A | 4/2015 |
| CN | 104779680 A | 7/2015 |
| EP | 2578997 A1 | 4/2013 |
| EP | 3090905 A1 | 11/2016 |
| JP | 2000-341868 A | 12/2000 |
| JP | 2003-262525 A | 9/2003 |

(56) References Cited

FOREIGN PATENT DOCUMENTS

| JP | 2006-331405 A | 12/2006 |
|---|---|---|
| JP | 2007-116799 A | 5/2007 |
| JP | 2008009492 A | 1/2008 |
| JP | 2010-4666 A | 1/2010 |
| JP | 2010-107203 A | 5/2010 |
| JP | 2010-142026 A | 6/2010 |
| JP | 2010-230615 A | 10/2010 |
| JP | 2010-540907 A | 12/2010 |
| JP | 2011-83166 A | 4/2011 |
| JP | 2011-197932 A | 10/2011 |
| JP | 2011-253727 A | 12/2011 |
| JP | 2012-145499 A | 8/2012 |
| JP | 2012-211903 A | 11/2012 |
| JP | 2013-15933 A | 1/2013 |
| JP | 5362930 B1 | 12/2013 |
| JP | 2014-3803 A | 1/2014 |
| JP | 2014-524618 A | 9/2014 |
| JP | 2014-219749 A | 11/2014 |
| JP | 2014-225167 A | 12/2014 |
| JP | 2015-15875 A | 1/2015 |
| JP | 2015191425 A | 11/2015 |
| TW | 201321230 A1 | 6/2013 |
| TW | 201337805 A | 9/2013 |
| TW | I413015 B | 10/2013 |
| WO | 00/59230 A1 | 10/2000 |
| WO | 2013024484 A1 | 2/2013 |
| WO | 2013080211 A1 | 6/2013 |
| WO | 2015001930 A1 | 1/2015 |
| WO | 2017/086172 A1 | 5/2017 |
| WO | 2017/086173 A1 | 5/2017 |
| WO | 2017/086174 A1 | 5/2017 |

OTHER PUBLICATIONS

The extended European search report (EESR) dated Nov. 14, 2018 in a related European patent application.
The extended European search report (EESR) dated Nov. 15, 2018 in a related European patent application.
An English translation of the International Search Report of PCT/JP2016/082565 dated Dec. 27, 2016.
An English translation of the Written Opinion of PCT/JP2016/082565 dated Dec. 27, 2016.
An English translation of the International Search Report of a related international application PCT/JP2016/082675 dated Jan. 10, 2017.
An English translation of the Written Opinion of a related international application PCT/JP2016/082675 dated Jan. 10, 2017.
An English translation of the International Search Report of a related international application PCT/JP2016/082676 dated Jan. 24, 2017.
An English translation of the Written Opinion of a related international application PCT/JP2016/082676 dated Jan. 24, 2017.
An English translation of the International Search Report of a related international application PCT/JP2016/082677 dated Jan. 31, 2017.
An English translation of the Written Opinion of a related international application PCT/JP2016/082677 dated Jan. 31, 2017.
The Taiwanese Office Action of a related Taiwanese application 105136769 dated Jan. 22, 2018.
The Taiwanese Office Action of a related Taiwanese application 105136976 dated Feb. 12, 2018.
The extended European search report (EESR) dated Dec. 3, 2018 in a counterpart European patent application.
The U.S. Office Action dated Aug. 21, 2019 in a related U.S. Appl. No. 15/759,220.
The U.S. Office Action dated Aug. 7, 2019 in a related U.S. Appl. No. 15/759,223.
The U.S. Office Action dated Aug. 7, 2019 in a related U.S. Appl. No. 15/759,221.
The (translated) Japanese Office Action dated Jun. 25, 2019 in a related Japanese patent application.
The U.S. Office Action dated Nov. 29, 2019 in a related U.S. Appl. No. 15/759,221.
The U.S. Office Action dated Nov. 29, 2019 in a related U.S. Appl. No. 15/759,223.

* cited by examiner

| Station ID | Battery ID | Clock time | | | | | | | |
|---|---|---|---|---|---|---|---|---|---|
| | | 08:00 | 08:10 | 08:20 | 08:30 | 08:40 | 08:50 | 09:00 | 09:10 | |
| A | 1 | 1000 | 1100 | 1200 | 1300 | 1400 | 1500 | 1600 | 1600 | ⋮ |
| | 7 | 1600 | 1600 | 1600 | 1600 | 1600 | 1600 | 1600 | 1600 | ⋮ |
| | 2 | 400 | 500 | 600 | 700 | 800 | 900 | 1000 | 1100 | ⋮ |
| | 4 | 1300 | 1400 | 1500 | 1600 | 1600 | 1600 | 1600 | 1600 | ⋮ |
| | 15 | 400 | 500 | 600 | 700 | 800 | 900 | 1000 | 1100 | ⋮ |
| B | 5 | 1300 | 1400 | 1500 | 1600 | 1600 | 1600 | 1600 | 1600 | ⋮ |
| | 3 | 1100 | 1200 | 1300 | 1400 | 1500 | 1600 | 1600 | 1600 | ⋮ |
| | 19 | 400 | 500 | 600 | 700 | 800 | 900 | 1000 | 1100 | ⋮ |
| C | 11 | 1400 | 1500 | 1600 | 1600 | 1600 | 1600 | 1600 | 1600 | ⋮ |
| | 6 | 1000 | 1100 | 1200 | 1300 | 1400 | 1500 | 1600 | 1600 | ⋮ |
| | 8 | 1300 | 1400 | 1500 | 1600 | 1600 | 1600 | 1600 | 1600 | ⋮ |
| ⋮ | ⋮ | ⋮ | ⋮ | ⋮ | ⋮ | ⋮ | ⋮ | ⋮ | ⋮ | |

| Station ID | Average waiting time (minutes) | | | | | | | | |
|---|---|---|---|---|---|---|---|---|---|
| | 8 o'clock hour | 9 o'clock hour | 10 o'clock hour | 11 o'clock hour | 12 o'clock hour | 13 o'clock hour | 14 o'clock hour | 15 o'clock hour | ... |
| A | 5 | 5 | 10 | 0 | 0 | 0 | 0 | 0 | ... |
| B | 0 | 0 | 0 | 0 | 5 | 10 | 5 | 0 | ... |
| C | 10 | 5 | 5 | 0 | 0 | 0 | 0 | 0 | ... |
| ... | ... | ... | ... | ... | ... | ... | ... | ... | ... |

Statistical date indicating past crowding situation (average waiting time)

FIG. 4

| Station ID | Charging time | Travel time | Waiting time |
|---|---|---|---|
| A | 0 minutes | 5 minutes | 5 minutes |
| B | 30 minutes | 30 minutes | 0 minutes |
| C | 20 minutes | 5 minutes | 10 minutes |

FIG. 5

| Station ID | Exchange completion time |
|---|---|
| A | 5 minutes |
| B | 0 minutes |
| C | 15 minutes |

FIG. 6

BATTERY RESERVATION DEVICE

FIELD

The present invention relates to a battery reservation device that accepts reservations for batteries that can be exchanged and are installed in a vehicle or the like.

BACKGROUND

Recent years have seen systems constructed in which battery packs installed in a vehicle such as an electric motorcycle or an electric bicycle are used and then exchanged at a charging device where charged batteries are available.

For example, Patent Literature 1 discloses a secondary battery supply system in which various kinds of information, such as whether or not supply is possible in a secondary battery supply system, the number of batteries that can be supplied, and the supply price, are acquired and charging facility information is displayed on a display component in order to exchange secondary batteries that have been discharged in an electric vehicle.

CITATION LIST

Patent Literature

Patent Literature 1: JPA 2006-331405
Patent Literature 2: JPA 2010-230615

SUMMARY

However, the following problems are encountered with the above-mentioned conventional secondary battery supply systems.

With above the secondary battery supply systems disclosed in the above-mentioned publications, since how long it takes to complete the exchange of secondary batteries after their arrival at the charging facility is not taken into consideration, it is difficult for a user to select the battery station where secondary batteries can be exchanged most efficiently.

It is an object of the present invention to provide a battery reservation device with which a battery station capable of efficiently completing battery exchange can be presented to the user.

The battery reservation device pertaining to the first invention is a battery reservation device that accepts reservations for batteries that supply power to a specific power consumption element and that is exhangeable at a specific battery station, said device comprising a required charge amount acquisition component, a remaining battery charge acquisition component, a charging speed acquisition component, and an exchange completion time calculator. The required charge amount acquisition component acquires the required amount of battery the user needs. The remaining battery charge acquisition component acquires the remaining battery charge at the present time for each battery in a plurality of the battery stations. The charging speed acquisition component acquires the charging speed at each of the plurality of battery stations. The exchange completion time calculator calculates the exchange completion time for the batteries in each of the plurality of battery stations on the basis of the required charge amount acquired by the required charge amount acquisition component, the remaining battery charge at the present time acquired by the remaining battery charge acquisition component, and the charging speed of the batteries acquired by the charging speed acquisition component.

Here, when reserving the exchange of a battery installed in a vehicle or the like, for example, the user merely inputs the battery capacity that is required, etc., and is presented with the most suitable battery station according to the state of charge at each battery station (the current remaining battery charge, the charging speed, and so forth).

Here, the required charge amount acquired by the required charge amount acquisition component refers to the capacity of the battery that the user would like to obtain by exchanging the battery. For example, if the battery is installed in a vehicle, the required charge amount may be inputted by the user on the basis of the remaining battery charge at the present time, or may be acquired automatically from the reservation system, an on-board system, or the like.

Also, the remaining battery charge acquired by the remaining battery charge acquisition component refers to the remaining charge of each battery stored in the plurality of battery stations at the present time. The remaining battery charge is acquired by measuring the voltage at each battery station, adding up the charge and discharge currents, a combination of these, or another such method.

The charging speed acquired by the charging speed acquisition component refers to the setting (such as 600 W) of the chargers installed in the battery stations. This charging speed may be acquired from each battery station or may be acquired by retrieving charging speed data for each battery station that has been stored in advance.

The exchange completion time calculated by the exchange completion time calculator refers to the clock time at which the battery exchange is completed when battery exchange is performed at each battery station. The exchange completion time is calculated on the basis of the required charge amount requested by the user, the remaining battery charge at the present time at a battery station, and the charging speed at each battery station.

This tells the user who is reserving battery exchange at a battery station not only whether or not batteries can be exchanged at the battery station at the present time, the number of batteries that can be exchanged, the travel time, and so on, but also advises the user how long it will take to complete the battery exchange.

As a result, it is possible to provide information that is more valuable to the user than in the past, such as presenting the user with the battery station that can complete battery exchange most efficiently from among a plurality of battery stations.

The battery reservation device pertaining to the second invention is the battery reservation device pertaining to the first invention, further comprising a travel time calculator that calculates the travel time to a battery station on the basis of the distance from the current position of the power consumption element to the battery station. The exchange completion time calculator calculates the exchange completion time on the basis of the travel time, the required charge amount, the remaining battery charge, and the charging speed.

Here, the travel time to each battery station is calculated on the basis of the distance from the current position of the user to a battery station where the battery exchange is performed, and the exchange completion time is calculated on the basis of the travel time, the required charge amount, the remaining battery charge, and the charging speed.

Here, the current position of the user used in the calculation of the travel time can be sensed with a GPS (global positioning system) or the like, for example. The travel time to each battery station is calculated from the distance between the current position and each battery station, and the average speed of the moving means (such as an electric motorcycle, an electric automobile, an electric bicycle, or an electrically assisted bicycle).

Consequently, by combining the calculated travel time with the above-mentioned battery exchange completion time, it is possible to let the user know whether battery exchange can be performed immediately after arrival at the battery station, or whether there is a waiting time until the completion of charging.

As a result, the user can select, for example, from among a plurality of battery stations, a station that is somewhat farther away but has no waiting time after arrival, as opposed to a station that is closer in distance but has a waiting time after arrival.

The battery reservation device pertaining to the third invention is the battery reservation device pertaining to the second invention, wherein the exchange completion time calculator calculates the exchange completion time at a battery station on the basis of the required charge amount, the remaining battery charge, and the charging speed, and if the charging completion time exceeds the travel time, the difference between the travel time and the charging completion time is calculated as the exchange completion time, and if the charging completion time is equal to or less than the travel time, the exchange completion time is calculated as 0.

Here, in addition to the required charge amount, the remaining battery charge, and the charging speed mentioned above, the charging completion time at a battery station and the travel time to the battery station are also taken into account in calculating the exchange completion time.

Consequently, more useful information that takes into account the charging completion time and the travel time can be presented to the user who will exchange a battery at a battery station.

The battery reservation device pertaining to the fourth invention is the battery reservation device pertaining to the first invention, further comprising a waiting time acquisition component that acquires the waiting time from the clock time at which the power consumption element is considered to have arrived at the battery station until battery exchange is begun at the battery station. The exchange completion time calculator calculates the exchange completion time on the basis of the waiting time, the required charge amount, the remaining battery charge, and the charging speed.

Here, the waiting time attributable to factors other than the time until the battery is charged by the charger at a battery station is calculated, and the exchange completion time is calculated on the basis of the waiting time, the required charge amount, the remaining battery charge and the charging speed.

Here, the waiting time acquired by the waiting time acquisition component refers to the time the user waits in line for battery exchange after arriving at the battery station.

Consequently, the battery station capable of performing battery exchange most efficiently can be presented to the user, taking into account the waiting time attributable to factors other than the time until the battery is charged by the charger at the battery station.

The battery reservation device pertaining to the fifth invention is the battery reservation device pertaining to the fourth invention, wherein the exchange completion time calculator calculates the charging completion time at a battery station on the basis of the required charge amount, the remaining battery charge, and the charging speed, and if the charging completion time exceeds the waiting time, the charging completion time is calculated as the exchange completion time, and if the charging completion time is equal to or less than the waiting time, the waiting time is calculated as the exchange completion time.

Here, in addition to the required charge amount, the remaining battery charge, and the charging speed mentioned above, the charging completion time at a battery station and the waiting time from the clock time at which the battery is considered to have arrived at the battery station are taken into account to calculate the exchange completion time.

Consequently, more useful information that takes into account the charging completion time and the waiting time can be presented to the user who will exchange a battery at a battery station.

The battery reservation device pertaining to the sixth invention is the battery reservation device pertaining to the second invention, further comprising a waiting time acquisition component that acquires the waiting time from the clock time at which the power consumption element is considered to have arrived at the battery station until battery exchange is begun at the battery station. The exchange completion time calculator calculates the exchange completion time on the basis of the travel time, the waiting time, the required charge amount, the remaining battery charge, and the charging speed.

Here, in addition to the required charge amount, the remaining battery charge, and the charging speed mentioned above, the charging completion time at a battery station and the waiting time from the clock time at which the battery is considered to have arrived at the battery station are also taken into account in calculating the exchange completion time.

Consequently, more useful information that takes into account the charging completion time and the waiting time can be presented to the user who will exchange a battery at a battery station.

The battery reservation device pertaining to the seventh invention is the battery reservation device pertaining to the sixth invention, wherein the exchange completion time calculator calculates the charging completion time at a battery station on the basis of the required charge amount, the remaining battery charge, and the charging speed. If the charging completion time exceeds the sum of the travel time and the waiting time, the exchange completion time calculator calculates the difference between the travel time and the charging completion time as the exchange completion time, and if the charging completion time is equal to or less than the sum of the travel time and the waiting time, the waiting time is calculated as the exchange completion time.

Here, in addition to the required charge amount, the remaining battery charge, and the charging speed mentioned above, the charging completion time at a battery station, the travel time to the battery station, and the waiting time from the clock time at which the battery is considered to have arrived at the battery station are also taken into account in calculating the exchange completion time.

Consequently, more useful information that takes into account the charging completion time, the travel time, and the waiting time can be presented to the user who will exchange a battery at the battery station.

The battery reservation device pertaining to the eighth invention is the battery reservation device pertaining to any of the fourth to seventh inventions, wherein the waiting time acquisition component calculates the waiting time on the basis of the current situation of crowding at the battery station and/or statistical data indicating the extent of crowding in the past.

Here, the waiting time until battery exchange is started after arrival at the battery station is calculated in light of the state of crowding at the battery station.

Here, as the current situation of crowding can be, for example, the reservation situation at a battery station, the crowding situation photographed with a camera installed at the battery station, or the like. Also, the statistical data indicating the extent of crowding in the past may be, for example, busy periods that are ranked by day of the week, or the number of people who had to wait (batteries in queue).

Consequently, the battery station capable of performing battery exchange most efficiently can be presented to the user, taking into account the waiting time attributable to factors other than the time until the battery is charged by the charger at the battery station.

The battery reservation device pertaining to the ninth invention is the battery reservation device pertaining to any of the first to eighth inventions, further comprising a display controller that controls a display component so as to display the battery exchange completion time calculated by the exchange completion time calculator.

Here, as discussed above, the battery exchange completion time and so forth at each battery station can be displayed on the display component in order to present it to the user.

Here, when the battery is installed in a vehicle such as an electric motorcycle, for example, the display component includes a display screen attached to the vehicle, or the of a smartphone, a tablet terminal, or the like that is carried by the user.

Consequently, the user can refer to information displayed on the screen of the display component, such as the battery exchange completion time or the waiting time at each battery station, and select and reserve the battery station that can perform battery exchange most efficiently.

The display component can also be connected to the required charge amount acquisition component to which the required charge amount is inputted from the user, and used as a means for inputting the required charge amount.

The battery reservation device pertaining to the tenth invention is the battery reservation device pertaining to the ninth invention, wherein the display controller displays a plurality of battery stations as reservation destination candidates from the one with the shortest battery exchange completion time.

Here, of the plurality of battery stations displayed as reservation candidates, the one with the shortest battery exchange completion time is preferentially displayed on the display component.

This allows the user to easily select the battery station that can perform battery exchange most efficiently from among the plurality of battery stations displayed on the screen of the display component.

The battery reservation device pertaining to the eleventh invention is the battery reservation device pertaining to any of the first to tenth inventions, wherein the power consumption element is a vehicle.

Here, a vehicle such as an electric motorcycle, an electric automobile, an electric bicycle, or an electrically assisted bicycle is used as the power consumption element to which power is supplied from a battery.

Consequently, if the user who is driving the vehicle wants to exchange the installed battery because its remaining charge is low, he can make a reservation while being aware of how long it will take to complete the battery exchange at the nearest battery station. Also, he can select and reserve the battery station that can perform battery exchange most efficiently from among a plurality of battery stations.

Effects

The battery reservation device pertaining to the present invention allows a battery station capable of efficiently completing battery exchange to be presented to the user.

BRIEF DESCRIPTION OF THE DRAWINGS

FIG. 3 is a remaining battery charge estimation table for specific elapsed times, produced by a capacity calculator included in the battery reservation device in FIG. 2;

FIG. 4 is a table of statistical data showing the situation of crowding in the past, used for calculating the waiting time acquired by the waiting time acquisition component included in the battery reservation device in FIG. 2;

FIG. 5 is a table showing the charging time at each battery station, the travel time from the current position to the battery station, and the waiting time after arrival at the battery station, produced by the exchange completion time calculator included in the battery reservation device in FIG. 2;

FIG. 6 is a table showing the battery exchange completion time at each battery station, produced by the exchange completion time calculator included in the battery reservation device in FIG. 2;

DETAILED DESCRIPTION

The battery reservation device 10 pertaining to an embodiment of the present invention will now be described through reference to FIGS. 1 to 8.

Figure 1:
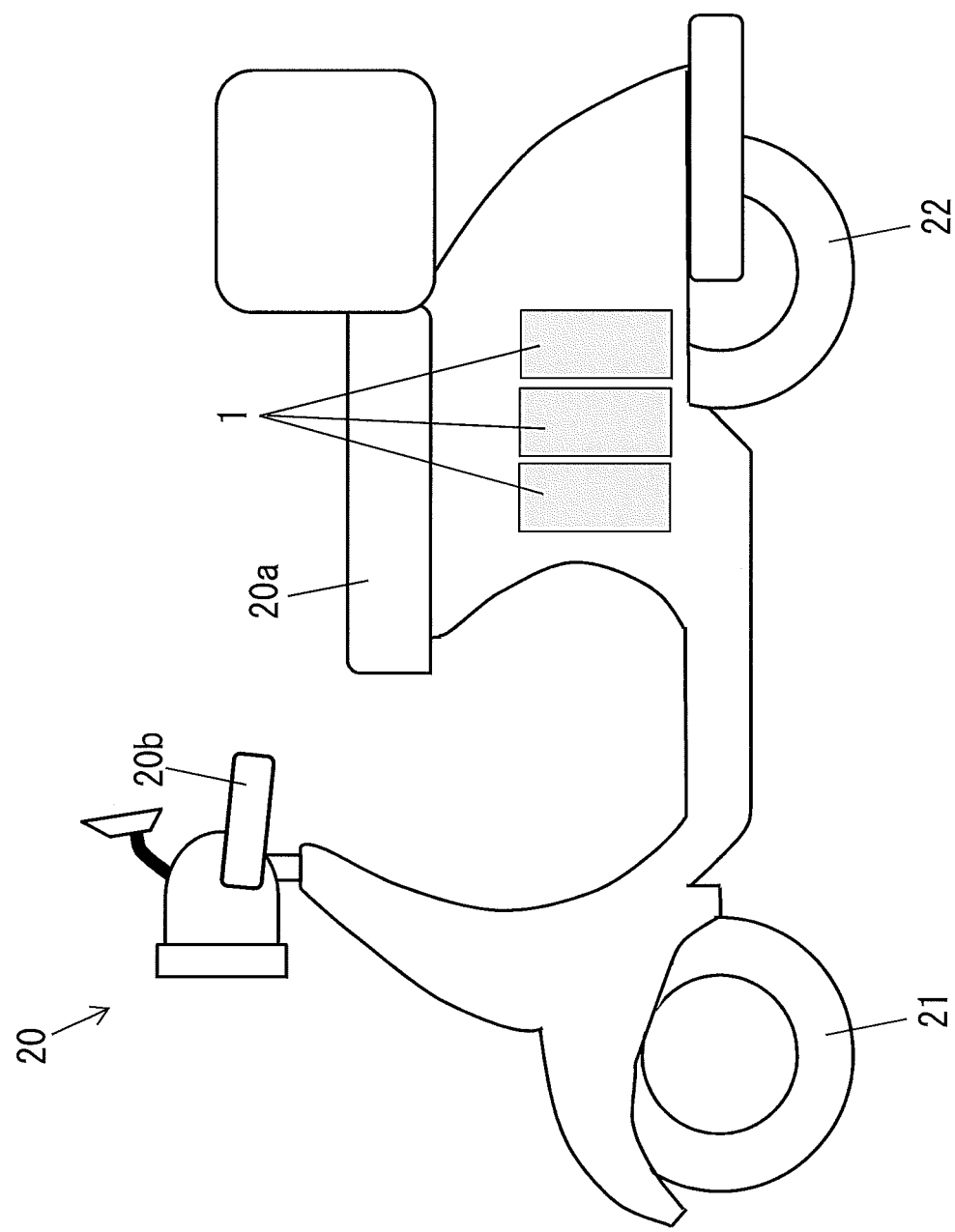
FIG. 1 is a diagram showing the configuration of a vehicle in which are installed battery packs that can be reserved with the battery reservation device pertaining to an embodiment of the present invention.

The battery reservation device 10 in this embodiment accepts an exchange reservation for battery packs 1 installed in an exchangeable state in a vehicle 20 such as the electric motorcycle shown in FIG. 1.

As shown in FIG. 1, the battery packs 1 are secondary batteries for supplying power to the vehicle 20, and three battery packs 1 are installed in an exchangeable state in the vehicle 20. The battery packs 1 are repeatedly used by being charged with a charger 31 (see FIG. 2) installed in a specific predetermined battery station 30.

Figure 2:
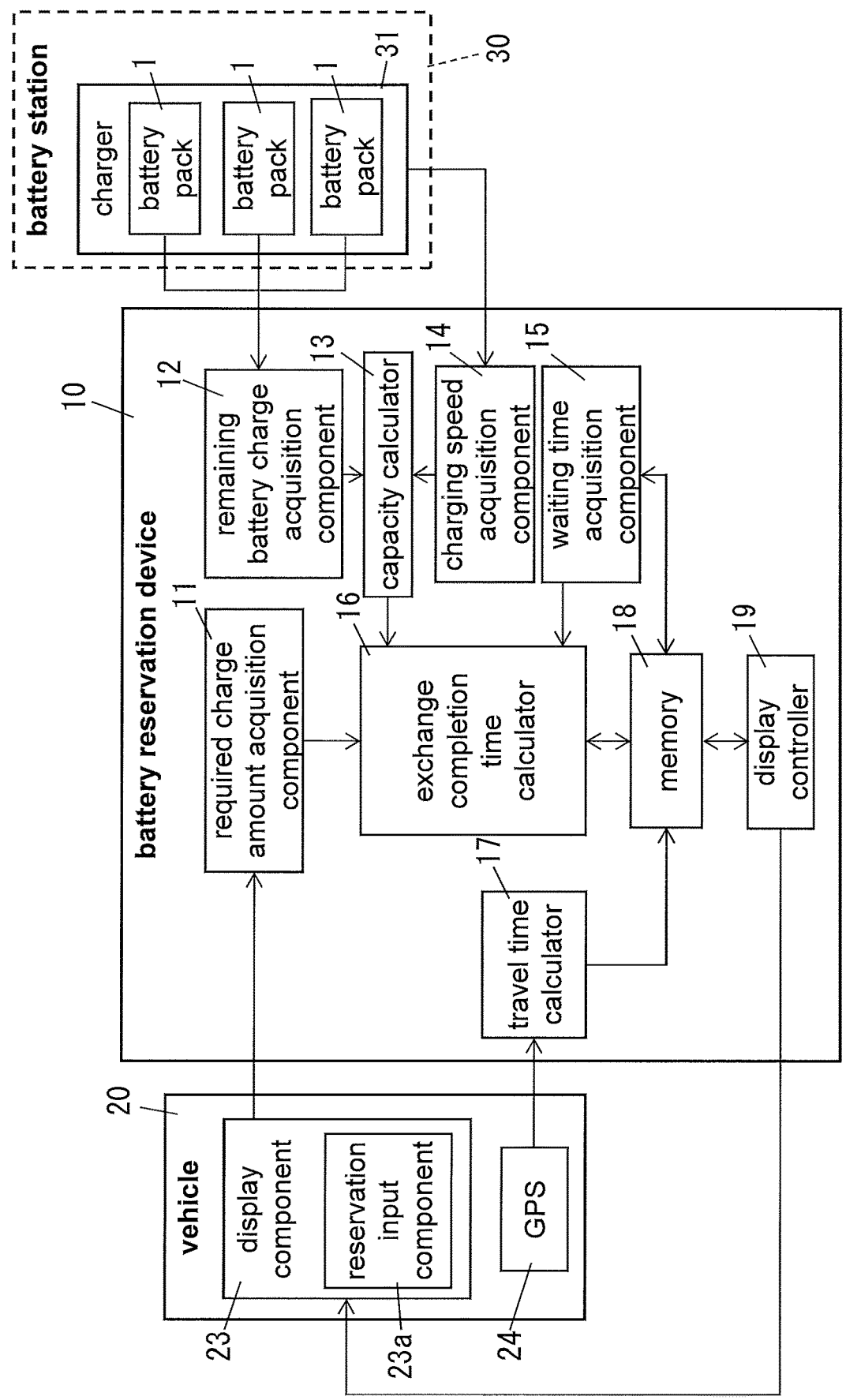
FIG. 2 is a block diagram showing the configuration of the battery reservation device for reserving the exchange of battery packs in FIG. 1.

The vehicle 20 is an electric motorcycle that is propelled when supplied with power from the three battery packs 10 installed under a seat 20a, and comprises a front wheel 21, a rear wheel (drive wheel) 22, a display component 23 (see FIG. 2), and a GPS (global positioning system) 24 (see FIG. 2).

The front wheel 21 is a steered wheel provided between the front part of the vehicle 20 and the road surface, and the travel direction can be varied by changing the orientation in conjunction with the orientation of a handle bar 20b.

The rear wheel 22 is a drive wheel provided between the road surface and the rear part of the vehicle 20 where the battery packs 10 are installed, and is rotationally driven by a motor (not shown).

The display component 23 is a display device provided near the center portion of the handle bar 20b of the vehicle 20, and displays the remaining battery charge of the three battery packs 1 installed in the vehicle 20, vehicle speed, and the like. The display component 23 is constituted by a touch panel type of liquid crystal display device, for example.

Also, the display component 23 displays information related to the travel time to each battery station 30 (discussed below), the waiting time after arrival, and so forth, and displays a selection screen for selecting the best battery station 30. Furthermore, the display component 23 has a reservation input component 23a in which reservation information for reserving battery exchange is inputted to the battery reservation device 10.

When the remaining battery charge of a battery pack 1 decreases, the user looks at the remaining battery charge at that time and inputs the remaining battery charge required at the time of exchange to the reservation input component 23a. The reservation input component 23a then inputs the battery station 30 to be reserved by the user via the selection screen displayed on the display component 23.

The GPS 24 is installed in the vehicle 20, receives a signal from a GPS satellite, and acquires current position information for the vehicle 20. The GPS 24 then transmits the acquired current position information to a travel time calculator 17 of the battery reservation device 10.

Configuration of Battery Reservation Device 10

The battery reservation device 10 is a device that accepts reservation for battery packs 1 that are charged or being charged and are stored in the plurality of battery stations 30, and is installed in each battery station 30, for example. As shown in FIG. 2, the battery reservation device 10 comprises a required charge amount acquisition component 11, a remaining battery charge acquisition component 12, a capacity calculator 13, a charging speed acquisition component 14, a waiting time acquisition component 15, an exchange completion time calculator 16, the travel time calculator 17, a memory (storage component) 18, and a display controller 19.

In this embodiment, the battery packs 1 reserved by the battery reservation device 10 include those that have been charged by the time of reservation, and those that are being charged (see the table in FIG. 3).

The required charge amount acquisition component 11 obtains the required charge amount inputted via the reservation input component 23a of the display component 23 by a user who has looked at the remaining battery charge, etc., of the battery packs 1 installed in the vehicle 20.

The remaining battery charge acquisition component 12 acquires the remaining battery charge of the battery packs 1 that are charged or are being charged, from the charger 31 installed in a battery station 30 where a plurality of battery packs 1 are stored.

The capacity calculator 13 produces a remaining battery charge estimation table (see FIG. 3) indicating the remaining battery charge of each battery pack 1 for each elapsed time on the basis of the remaining battery charge and the charging speed respectively acquired by the remaining battery charge acquisition component 12 and the charging speed acquisition component 14.

The remaining battery charge estimation table shown in FIG. 3 shows IDs specific to the respective battery stations 30, IDs specific to the respective battery packs 1 stored in the respective battery stations 30, and the estimated value of the remaining battery charge after various elapsed times for each battery pack.

More specifically, FIG. 3 shows the estimated values of the remaining battery charge when a battery pack 1 is charged to 1600 wh (full charge) with the charger 31, which charges 100 wh every 10 minutes.

The charging speed acquisition component 14 acquires the charging speed of the charger 31 installed at each battery station 30.

In this embodiment, since a plurality of chargers 31 having substantially the same charging speed are installed at one battery station 30, the charging speed of any one of the chargers 31 may be acquired.

The waiting time acquisition component 15 acquires the estimated value of the waiting time by referring to at least one of the reservation status for battery exchange at the present time stored in the memory 18, statistical data (see FIG. 4) indicating the situation of crowding in the past at each battery station 30, and so forth.

The waiting time calculated by the waiting time acquisition component 15 refers to the waiting time from the clock time when the vehicle 20 is considered to have arrive at the battery station 30 until the battery exchange is started at the battery station 30.

The statistical data shown in FIG. 4 shows, for example, that at the battery station 30 with the ID "A," there is a waiting time of about 5 minutes on average during the 8 o'clock and 9 o'clock hours, the maximum waiting time of 10 minutes happens during the 10 o'clock hour, and there is no wait from 11 o'clock onward. At the battery station 30 with the ID "B," there is no wait until 12 o'clock, there is a waiting time of about 5 minutes on average during the 12 o'clock and 14 o'clock hours, and the maximum wait of 10 minutes happens during the 13 o'clock hour. At the battery station 30 with the ID "C," the maximum average waiting time of 10 minutes happens during the 8 o'clock hour, there is a wait of about 5 minutes on average during the 9 o'clock and 10 o'clock hours, and there is no wait from 11 o'clock onward.

The estimated values of the waiting time acquired by the waiting time acquisition component 15 refer to the waiting time until battery exchange is begun, taking into consideration the number of people waiting when the vehicle 20 arrives at the battery station 30.

The exchange completion time calculator 16 calculates the charging completion time and the exchange completion time for the battery packs 1 on the basis of the required charge amount acquired by the required charge amount acquisition component 11, the remaining battery charge table created by the capacity calculator 13, and the waiting time acquired by the waiting time acquisition component 15.

Here, the time until the completion of the battery exchange means a length of time indicating how many hours and minutes it will take to ready the required battery packs 1 and complete the exchange, on the basis of the charging status of the battery packs 1 at the battery station 30 at the present time and the required charge amount inputted by the user.

For instance, in the remaining battery charge estimation table shown in FIG. 3, assuming that the required charge amount of one battery pack is 1600 wh, a battery pack 1 with the ID "7" is stored at the present time (8 o'clock) at the battery station 30 with the ID Meanwhile, at the battery station 30 with the ID "B," there is no battery pack 1 that has been charged up to 1600 wh at the present time (8 o'clock), and even the battery pack 1 with the ID "5" that has the largest remaining charge will require further charging of 30 minutes. For this reason, at the battery station 30 whose ID is "B," battery exchange cannot performed until 8:30.

Likewise at battery station 30 whose ID is "C," there is no battery pack 1 that has been charged up to 1600 wh at the present time (8 o'clock), and the battery pack 1 with the ID "11" having the highest remaining charge will require further charging for 20 minutes. Therefore, at the battery station 30 with the ID "C," battery exchange cannot be performed until 8:20.

The travel time calculator 17 calculates the estimated travel time to each battery station 30 by using the current position information received via the GPS 24 installed in the vehicle 20, the distance to each battery station 30, and the average speed over the previous hour of the vehicle 20.

More specifically, the travel time is calculated from the following relational formula (1).

$$\text{Movement time} = (\text{distance from current position to each battery station (km)}) \div (\text{average speed(km/h) over the previous hour}) \quad (1)$$

The prediction accuracy of the estimated travel time can be improved by further acquiring information such as the traffic congestion along the roads leading to each battery station 30.

The memory (storage component) 18 stores information related to the exchange completion time for battery packs 1 at each battery station 30, the waiting time until battery exchange will start, and the travel time from the current position of the vehicle 20 to each battery station 30, at each battery station 30.

More specifically, the memory 18 stores a table including the charging time to reach the required charge amount of the battery packs 1 at each battery station 30 as shown in FIG. 5, the travel time to the battery stations 30, and the waiting time until the battery exchange begins.

The memory 18 stores a table (see FIG. 6) listing a exchange completion time of each battery station 30 calculated using the table shown in FIG. 5.

A battery exchange is completed by the simple task of taking out the desired battery packs 1 from the charger 31 installed at a battery station 30, and exchanging them for the battery packs 1 currently installed in the vehicle 20. Therefore, the exchange completion times shown in FIG. 6 are the same as the length of time in which battery exchange can be performed at each battery station 30.

Furthermore, as described above, in order to calculate the waiting time until the battery exchange starts, which is acquired by the waiting time acquisition component 15, the memory 18 stores data such as the crowding situation in the past for each time period at each battery station 30. Map information for calculating the distance to each battery station 30 from the current position information is stored ahead of time in the memory 18.

The display controller 19 uses various kinds of information stored in the memory 18 to control the display of the display component 23 installed in the vehicle 20.

Figure 7:
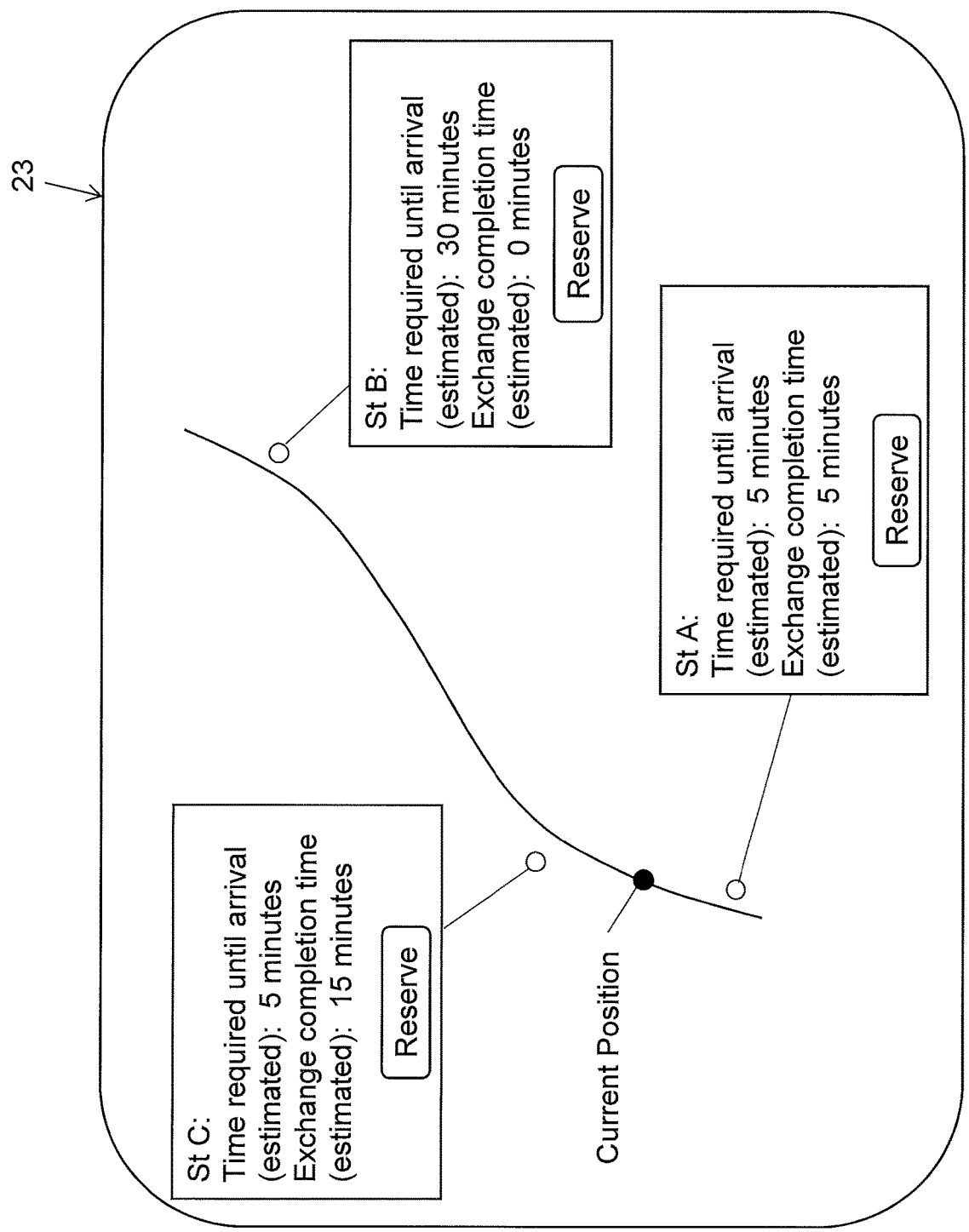
FIG. 7 is a diagram showing a display screen including the travel time from the current position displayed on the display component of the vehicle in FIG. 1 to each battery station, and the waiting time after arrival.

More specifically, the display controller 19 causes the display component 23 of the vehicle 20 to display the screen shown in FIG. 7, which is produced by referring to the tables shown in FIGS. 5 and 6.

The three battery stations 30 closest to the current position of the vehicle 20 are shown on the screen shown in FIG. 7.

Here, FIG. 7 shows map information indicating the current position, along with the estimated travel time to each battery station (St) 30, and the waiting time after arrival.

Consequently, the user can look at the screen of the display component 23 of the vehicle 20 and easily see the battery exchange completion time at the three battery stations 30 (IDs of "A," "B," "C") proposed from the battery reservation device 10.

That is, as shown in FIG. 7, for the battery stations 30 the IDs of "A" and "C" are both near the current position, with a travel time of 5 minutes.

The remaining charge of the battery packs 1 stored at the battery station 30 with the ID of "A" has reached the required charge amount (1600 wh) at the present time (8:00). However, this battery station 30 is crowded, so the waiting time after arrival is 5 minutes.

Thus, at the battery station 30 with the ID of "A," battery packs 1 that can be exchanged right away are available, but because the battery station 30 is busy, the user will have to wait his turn, so there is a waiting time of 5 minutes before battery exchange will start.

Also, the remaining charge of the battery packs 1 stored at the battery station 30 with the ID of "C" does not reach the required charge amount (1600 wh) at the present time (8:00). Therefore, further charging by the charger 31 will be needed at the battery station 30, and the battery packs 1 that are to be exchanged will not be ready until 8:20. Because this battery station 30 is busy, the waiting time will be 10 minutes at the time of arrival 5 minutes from now.

Thus, at the battery station 30 with the ID of "C," even though the user arrives in 5 minutes, the battery packs 1 to be exchanged will not be ready until 8:20, when the battery packs 1 will have been charged to the required charge amount. Therefore, at the battery station 30 with the ID of "C," the user will have to wait for the battery packs 1 at the battery station 30 after arrival, so the total wait until the battery exchange starts is 15 minutes.

At the battery station 30 with the ID of "C," the crowded situation results in a waiting time of 10 minutes, but because the charging wait time is a longer 15 minutes, the 10-minute waiting time caused by crowding does not need to be taken into consideration.

On the other hand, as shown in FIG. 7, with the battery station 30 whose ID is "B," the distance from the current position is far, and the travel time is 30 minutes. However, the remaining charge of the battery packs 1 ID stored at the battery station 30 with the ID of "B" has reached the required charge amount (1600 wh) at the present time (8:00). For this reason, at the battery station 30 with the ID of "B," the waiting time until the start of battery exchange at the time of arrival 30 minutes from now is 0 minutes.

That is, in this embodiment, the time it takes from the arrival at the battery station 30 until battery exchange completion is calculated on the basis of the calculated charging time of the battery packs 1, the travel time from the current position to the battery station 30, and the waiting time after arrival.

Here, if (charging time−travel time)>(waiting time), the exchange completion time is calculated from the following equation (2).

$$\text{Exchange completion time} = (\text{charging time} - \text{travel time}) \quad (2)$$

On the other hand, if (charging time−travel time)≤(waiting time), the exchange completion time is calculated from the following equation (3).

$$\text{Exchange completion time} = \text{travel time} \quad (3)$$

As a result, the user can look at the screen of the display component 23 of the vehicle 20, and if he wants to exchange batteries at the nearest battery station 30 from the current position, he can reserve the battery station 30 with the ID of "A," which has a short waiting time.

Alternatively, if the user wants to exchange batteries at the battery station 30 with the shortest possible waiting time, he can reserve the battery station 30 with the ID of "B," which has a travel time of 30 minutes, but has a waiting time of 0 minutes.

When reserving a battery station 30, the user touches the reserve button included in the box for the relevant battery station 30 displayed on the map information in FIG. 7. This reserve button functions as the reservation input component 23a of the display component 23 installed in the vehicle 20, allowing the battery station 30 selected by the user to be inputted.

Also, the exchange completion time shown in FIG. 7 may be indicated as the clock time ("hour:minutes") of exchange completion, rather than indicating the length of time after arrival at the battery station 30 as a number of minutes.

Flow up to Reservation Acceptance in Battery Reservation Device 10

Figure 8:
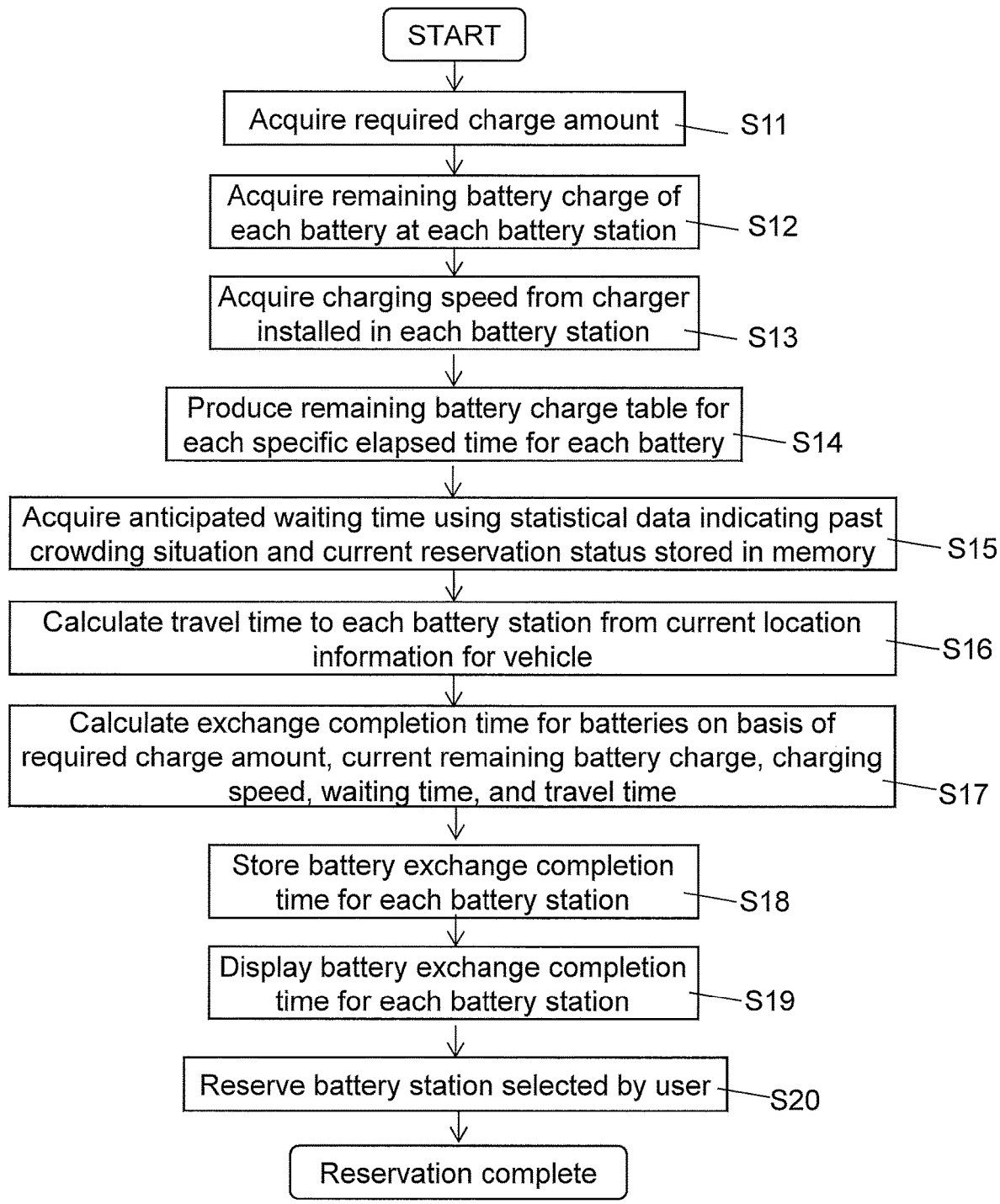
FIG. 8 is a flowchart of the flow of battery reservations in the battery reservation device in FIG. 2.

With the battery reservation device 10 in this embodiment, the best battery station 30 for the user is selected and an exchange reservation for the battery packs 1 is accepted according to the flowchart shown in FIG. 8.

That is, in step S11, the required charge amount acquisition component 11 acquires the required charge amount inputted by the user via the display component 23 of the vehicle 20.

Next, in step S12, the remaining battery charge acquisition component 12 acquires the remaining charge of each battery pack 1 stored in each battery station 30 from the chargers 31 installed at the battery stations 30.

As to the remaining battery charge acquired here, a full charge of 1600 wh is acquired for the charged battery packs 1, and the numerical value of the remaining battery charge at that time is acquired for the battery packs 1 being charged.

Next, in step S13, the charging speed acquisition component 14 acquires the charging speed from the chargers 31 installed in the battery stations 30.

In this embodiment, the charging speed by all the chargers 31 installed in the battery stations 30 is set to a common numerical value of 100 wh/10 min.

Next, in step S14, the capacity calculator 13 produces a remaining charge table (see FIG. 3) for each specific elapsed time on the basis of the required charge amount acquired in step S11 and the remaining battery charge and the charging speed acquired in steps S12 and S13.

Next, in step S15, the waiting time acquisition component 15 acquires (calculates) the expected waiting time at the time of arrival by using statistical data indicating the current reservation status at each battery station 30 and the past crowding situation stored in the memory 18.

Next, in step S16, the travel time calculator 17 calculates the travel time to each battery station 30 on the basis of the distance from the current position of the vehicle 20 to each battery station 30 and the average hourly speed of the vehicle 20 over past hour.

The current position information for the vehicle 20 can be received from the GPS 24 installed in the vehicle 20.

Next, in step S17, the exchange completion time calculator 16 calculates the exchange completion time (how soon exchange can begin) for the battery packs 1 on the basis of the required charge amount, the remaining charge of the battery packs 1, the charging speed, the waiting time at each battery station 30, and the travel time to each battery station 30.

Next, in step S18, the battery exchange completion time calculated in step S17 is stored in the memory 18.

Next, in step S19, the display controller 19 causes the display component 23 of the vehicle 20 to display the battery exchange completion time for each battery station 30 stored in the memory 18 in step S18.

Next, in step S20, the best battery station 30 for the exchange of the battery packs 1 is selected by the user, who has seen the information displayed on the display component 23 of the vehicle 20 in step S19.

With the battery reservation device 10 in this embodiment, as described above, rather than providing the vehicle 20 with information related to whether or not an exchange can be made for battery packs 1 that have already been charged, information is provided about the battery stations 30 that takes into consideration the state of charging of battery packs 1 that are being charged.

Consequently, the user can select the best battery station 30 from among a plurality of battery stations 30 where the battery packs 1 can be exchanged.

Also, with the battery reservation device 10 in this embodiment, the travel time to each battery station 30 is calculated by using current position information for the vehicle 20.

Consequently, the user can also be advised as to whether or not there will be a waiting time upon arrival from the current position to a battery station 30.

This widens the choices for the user, such as selecting a battery station 30 that is on the user's way and is farther from the current position but will not requiring waiting, rather than a battery station 30 that is closer to the current position but will require waiting upon arrival.

Other Embodiments

An embodiment of the present invention was described above, but the present invention is not limited to the above embodiment, and various modifications are possible without departing from the gist of the invention.

(A)

In the above embodiment, an example was described in which, when a reservation was made to exchange the battery packs 1, the user checked the remaining battery charge and inputted the required charge amount via the screen of the display component 23 attached to the vehicle 20 (such as an electric motorcycle). However, the present invention is not limited to this.

For example, if the remaining charge of the battery packs installed in a vehicle is equal to or less than a specific value, the amount of charging required to reserve batteries automatically via a communication component provided to the vehicle or the like may be calculated and transmitted to the battery reservation device 10.

In this case, since the required charge amount that is required for reservation is inputted from the vehicle side, the user can make a reservation from among the plurality of battery stations displayed on the display component simply by selecting the battery station where battery exchange can be carried out most efficiently.

(B)

In the above embodiment, an example was given in which the chargers 31 installed at the battery stations 30 were set to a common charging speed. However, the present invention is not limited to this.

For example, if a plurality of chargers 31 with different charging speed settings are installed in a single battery station 30, the charging speed set for each charger 31 may be acquired and the table shown in FIG. 3 produced.

(C)

In the above embodiment, an example was given in which the battery exchange completion time calculated by the battery reservation device 10 was presented to the user by displaying it on the screen of the display component 23 of the vehicle 20. However, the present invention is not limited to this.

For example, in addition to the screen display on the display component, the battery station that allows the most efficient battery exchange may also be presented by voice guidance, or a combination of display and voice guidance may be presented.

(D)

In the above embodiment, an example was given in which the travel time calculator 17 calculated the travel time from the current position to each battery station 30, and the result was displayed on the display component 23 of the vehicle 20. However, the present invention is not limited to this.

For example, the battery reservation device may be configured not to calculate the travel time.

In this case, the travel time from the current position to each battery station is not known. However, as shown in FIG. 7, if a display is given that shows the positional relation between the current position and the battery stations in terms of map information, then even though the travel time is not calculated, a reservation device that makes selection easy for the user can be provided.

Similarly, with the waiting time acquisition component 15, the battery reservation device may be configured not to calculate the travel time.

Here again, the user can recognize the exchange completion time (clock time) for the battery packs at each battery station, and can choose and reserve the best battery station, taking into account the status of the battery packs being charged at the battery stations.

(E)

In the above embodiment, as shown in FIG. 7, an example was given in which a plurality of battery stations 30 located in the surroundings of the current position of the vehicle 20 were displayed as map information on the display component 23 of the vehicle 20. However, the present invention is not limited to this.

For example, the display mode on the display component of the vehicle need not be a method in which it is displayed over map information, and a display mode may also be employed in which the battery stations are displayed in order of the shortest battery exchange completion time.

In this case, the user can choose the best battery station from among a plurality of batteries stations listed in ascending order of battery exchange completion time.

(F)

In the above embodiment, an example was given in which just one battery pack was exchanged at a battery station 30. However, the present invention is not limited to this.

For example, if two or more battery packs need to be exchanged at the same time, the required charge amount acquisition component may be configured to acquire the number of batteries to be exchanged and the required charge amount at the same time.

In this case, if two battery packs are to be exchanged at the same time, for example, a battery pack combination having a remaining battery charge that is in line with the number of battery packs stored at each battery station and the combined required charge amount (for two batteries) may be considered.

(G)

In the above embodiment, an example was given in which information related to the charging speed at the battery stations 30 calculated by the charging speed acquisition component 14 was acquired from the chargers 31 of the battery stations 30. However, the present invention is not limited to this.

For example, information about the charging speed of the chargers installed at the battery stations may be stored in advance in a storage component such as the memory 18, and information about charging speed may be retrieved from the memory 18 when required.

(H)

In the above embodiment, an example was given in which the waiting time acquired by the waiting time acquisition component 15 was acquired by referring to the current reservation status, statistical data indicating the extent of past crowding stored in the memory 18, etc. However, the present invention is not limited to this.

For example, a camera installed at the battery station may be used to capture an image of the batteries lined up for exchange at a battery station, and the current crowding situation may be acquired on the basis of this image information.

(I)

In the above embodiment, as shown in FIG. 7, an example was given in which three battery stations 30 within a short distance of the current position were listed as reservation destination candidates. However, the present invention is not limited to this.

For example, all of the battery stations included on a map of a specific scale and centered on the current position may be displayed as reservation destination candidates. Also, in an area where there are few battery stations, for example, the scale of the map information may be adjusted in the display so that three or more battery stations are included.

In this case, the user can always reserve and select the best battery station from among a plurality of battery stations.

Furthermore, a plurality of battery stations that are reservation destination candidates may be set so that only those battery stations that have been pre-selected by the user appears as choices.

In this case, the user can select and display battery stations preset by the user, battery stations that charge lower fees for exchange, and so on.

(J)

In the above embodiment, an example was given in which the battery reservation device 10 was installed at each battery station 30. However, the present invention is not limited to this.

For example, a battery reservation device may be installed in each vehicle.

In this case, each vehicle acquires required information, such as the battery pack charging status at each battery station, via a communication component, which allows the best battery station to be presented.

(K)

In the above embodiment, an example was given in which the battery packs 1 pertaining to the present invention were used as secondary batteries installed in a vehicle 20 such as an electric motorcycle. However, the present invention is not limited to this.

For example, the present invention be applied to battery packs for supplying power not only to electric motorcycles, but also to electric unicycles, electric bicycles, electrically assisted bicycles, electric automobiles (EVs), PHVs (plug-in hybrid vehicles), and other such vehicles.

Alternatively, the configuration in which the battery pack of the present invention is installed is not limited to a vehicle, and may instead be some other electronic product that is driven by replaceable batteries.

In this case, for example, travel time can be calculated by using the distance between a battery station where battery exchange is performed and a workplace, home, or the like where an electrical product is installed, allowing a battery to be reserved by taking into account the waiting time after arrival at the battery station.

INDUSTRIAL APPLICABILITY

The battery reservation device of the present invention has the effect of making it possible to present a user with battery stations where battery exchange can be completed most efficiently, and therefore can be widely applied to battery stations or the like where battery exchange is performed.

REFERENCE SIGNS LIST 1 battery pack
10 battery reservation device
11 required charge amount acquisition component
12 remaining battery charge acquisition component
13 capacity calculator
14 charging speed acquisition component
15 waiting time acquisition component
16 exchange completion time calculator
17 travel time calculator
18 memory (storage component)
19 display controller
20 vehicle
20a seat
20b handle bar
21 front wheel
22 rear wheel
23 display component
23a reservation input component
24 GPS
30 battery station
31 charger
S step

The invention claimed is:

1. A battery reservation device that accepts reservations for batteries that supply power to a specific power consumption element and that are exchangeable at a battery station, the device comprising a processor configured with a program to perform operations comprising:
  acquiring a required charge amount comprising a required amount of battery a user needs;
  acquiring a remaining battery charge at a present time for each battery in a plurality of the battery stations;
  acquiring a charging speed at each of the plurality of battery stations;
  calculating travel times to each of the plurality of battery stations on the basis of distances from a current position of the power consumption element to the plurality of battery stations; and
  calculating, for each of the plurality of battery stations, an exchange completion time for the batteries in the battery station on the basis of the required charge amount, the remaining battery charge, the travel time to the battery station, and the charging speed, and
  wherein the processor is configured with the program such that calculating the exchange completion time comprises calculating the exchange completion time at a battery station on the basis of the required charge amount, the remaining battery charge, and the charging speed, and
  in response to a charging completion time exceeding the travel time, a difference between the travel time and the charging completion time is calculated as the exchange completion time, and in response to the charging completion time is equal to or less than the travel time, the exchange completion time being calculated as 0.

2. The remaining battery charge according to claim 1, wherein the processor is configured with the program to perform operations further comprising:
  controlling a display component so as to display the calculated battery exchange completion time.

3. The battery reservation device according to claim 2, wherein the processor is configured with the program to perform operations further comprising causing the display component to display the plurality of battery stations as reservation destination candidates from the one with the shortest battery exchange completion time.

4. The battery reservation device according to claim 1, wherein the power consumption element comprises a vehicle.

5. A battery reservation device that accepts reservations for batteries that supply power to a specific power consumption element and that are exchangeable at a battery station, the device comprising a processor configured with a program to perform operations comprising:
  acquiring a required charge amount comprising a required amount of battery a user needs;
  acquiring a remaining battery charge at a present time for each battery in a plurality of the battery stations;
  acquiring a charging speed at each of the plurality of battery stations;
  calculating travel times to each of the plurality of battery stations on the basis of distances from a current position of the power consumption element to the plurality of battery stations;
  calculating, for each of the plurality of battery stations, an exchange completion time for the batteries in the battery station on the basis of the required charge amount, the remaining battery charge, the travel time, and
  acquiring a waiting time from a clock time at which the power consumption element is considered to have arrived at the battery station until battery exchange is begun at the battery station,
  wherein calculating the exchange completion time comprises calculating exchange completion time on the basis of the waiting time, the required charge amount, the remaining battery charge, and the charging speed, and
  wherein the processor is configured with the program to perform operations further comprising calculating a charging completion time at a battery station on the basis of the required charge amount, the remaining battery charge, and the charging speed, and
  wherein in response to the charging completion time exceeding the waiting time, the charging completion time is calculated as the exchange completion time, and in response to the charging completion time being equal to or less than the waiting time, the waiting time is calculated as the exchange completion time.

6. A battery reservation device that accepts reservations for batteries that supply power to a specific power consumption element and that are exchangeable at a battery station, the device comprising a processor configured with a program to perform operations comprising:

acquiring a required charge amount comprising a required amount of battery a user needs;

acquiring a remaining battery charge at a present time for each battery in a plurality of the battery stations;

acquiring a charging speed at each of the plurality of battery stations;

calculating travel times to each of the plurality of battery stations on the basis of distances from a current position of the power consumption element to the plurality of battery stations; and calculating, for each of the plurality of battery stations, an exchange completion time for the batteries in the battery station on the basis of the required charge amount, the remaining battery charge, the travel time, and acquiring a waiting time from a clock time at which the power consumption element is considered to have arrived at the battery station until battery exchange is begun at the battery station, wherein calculating the exchange completion time comprises calculating the exchange completion time on the basis of the travel time, the waiting time, the required charge amount, the remaining battery charge, and the charging speed, and wherein the processor is configured with the program to perform operations further comprising calculating a charging completion time at a battery station on the basis of the required charge amount, the remaining battery charge, and the charging speed, and in response to the charging completion time exceeding a sum of the travel time and the waiting time, the processor calculates a difference between the travel time and the charging completion time as the exchange completion time, and in response to the charging completion time being equal to or less than the sum of the travel time and the waiting time, the waiting time is calculated as the exchange completion time.

7. The battery reservation device according to claim 5, wherein the processor is configured with the program to perform operations further comprising calculating the waiting time on the basis of a current situation of crowding at the battery station and/or statistical data indicating an extent of crowding in the past.

* * * * *